United States Patent
Stern

(10) Patent No.: US 9,140,214 B2
(45) Date of Patent: Sep. 22, 2015

(54) METHOD OF USING AN AFTERBURNER TO REDUCE HIGH VELOCITY JET ENGINE NOISE

(75) Inventor: Alfred M. Stern, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 723 days.

(21) Appl. No.: 13/407,018

(22) Filed: Feb. 28, 2012

(65) Prior Publication Data

US 2013/0219855 A1    Aug. 29, 2013

(51) Int. Cl.
   *F02K 3/10*    (2006.01)

(52) U.S. Cl.
   CPC .............. *F02K 3/10* (2013.01); *F05D 2260/96* (2013.01)

(58) Field of Classification Search
   CPC ............ F02K 3/10; F02K 3/077; F02K 3/11; F02K 3/08
   USPC ................... 60/761, 762, 767, 768, 207, 262; 239/265.11–265.43
   See application file for complete search history.

(56) References Cited

U.S. PATENT DOCUMENTS

| | | | |
|---|---|---|---|
| 3,739,984 A | 6/1973 | Tontini | |
| 3,830,431 A | 8/1974 | Schwartz | |
| 3,987,621 A | 10/1976 | Sabatella, Jr. et al. | |
| 4,010,608 A * | 3/1977 | Simmons | 60/226.3 |
| 4,175,384 A * | 11/1979 | Wagenknecht et al. | 60/226.3 |
| 5,440,875 A | 8/1995 | Torkelson et al. | |
| 5,513,982 A * | 5/1996 | Althaus et al. | 431/350 |
| 5,867,980 A * | 2/1999 | Bartos | 60/226.3 |
| 6,880,784 B1 | 4/2005 | Wilkinson et al. | |
| 6,895,756 B2 * | 5/2005 | Schmotolocha et al. | 60/761 |
| 2006/0080962 A1 | 4/2006 | Steele | |
| 2009/0100823 A1 | 4/2009 | Jones | |
| 2009/0208328 A1 | 8/2009 | Stern | |

OTHER PUBLICATIONS

Burcham, Frank, "Measurements and Predictions of Flyover and Static Noise of a TF30 Afterburning Turbofan Engine", 1978, NASA Technical Paper 1372.*
"Douglas F4D Skyray Pilot's Flight Operating Instructions", 1960, p. 64.*
Walsh, PP, "Gas Turbine Performance", 2004, Blackwell Publishing, Second Edition, pp. 410-411.*

* cited by examiner

*Primary Examiner* — Ehud Gartenberg
*Assistant Examiner* — Steven Sutherland
(74) *Attorney, Agent, or Firm* — Miller, Matthias & Hull LLP

(57) ABSTRACT

A system and method of reducing noise caused by jet engines is provided. The method comprises the steps of using the afterburner to heat the exhaust gas flow while simultaneously reducing power to the core engine. Together these two operations reduce the pressure of the exhaust gas in the nozzle area while holding the exhaust gas velocity constant, which maintains engine thrust while decreasing engine noise. The method may be supplemented by altering the location of the afterburner flames to create an inverted exhaust velocity profile, thereby decreasing engine noise even further.

4 Claims, 3 Drawing Sheets

1 Inner Burning Zone(s)
2 Outer Burning Zone(s)

METHOD OF USING AN AFTERBURNER TO REDUCE HIGH VELOCITY JET ENGINE NOISE

TECHNICAL FIELD

The subject matter of the present disclosure relates generally to jet engines. More particularly, the subject matter of the present disclosure relates to a system and method for reducing noise caused by jet engine aircraft equipped with afterburners.

BACKGROUND

Afterburners are systems that provide a temporary increase in jet engine thrust. They work by injecting into the engine nozzle region downstream of the combustion chamber additional fuel, which ignites due to the presence of unused oxygen in the exhaust stream. The ignited fuel produces a blowtorch effect, increasing the temperature and velocity of the exhaust gas shooting through the nozzle, which increases thrust.

Because of the inefficiencies inherent in most afterburner systems, primarily in the form of extra fuel consumption, afterburners typically are used in limited conditions, such as during take offs, when entering supersonic speeds, and during military combat maneuvers where a burst of speed is beneficial. (Afterburners can provide a short increase in thrust in military aircraft of between 40 and 70 percent.)

The jet engine nozzles used with afterburner systems must be able to open wider to accommodate the reduced density of exhaust gas. These special configuration nozzles, aka variable area nozzles, can be found in both military (fighter) jets and commercial (supersonic and business) jets equipped with afterburners.

Exhaust gas exiting the afterburners of high velocity jet engines can create undesirably high levels of noise, particularly mixing noise and shock noise. Mixing noise is a result of the mixing of the jet exhaust gas with the surrounding ambient air (and caused by the difference in shear), and generally increases as nozzle exhaust gas velocity increases. Shock noise is caused by shock waves generated in the engine exhaust plume of jets operating at supersonic speeds.

Thus there is a need for a system and method to reduce the high noise levels caused by jet engines equipped with afterburners.

SUMMARY

The present invention is a system and method of reducing noise caused by jet engines equipped with afterburners while maintaining thrust. The method comprises the steps of using the afterburner to heat the exhaust gas flow while simultaneously reducing power to the core engine. Together these two operations reduce the pressure (and density) of the exhaust gas in the nozzle area while holding the exhaust gas velocity constant, which maintains engine thrust while decreasing engine noise. The method may be supplemented by altering the location of the afterburner flames to create an inverted exhaust velocity profile, thereby decreasing engine noise even further.

In one illustrative embodiment the method comprises the steps of starting the engine to create exhaust gas flow through the variable area nozzle so that the exhaust gas has a temperature, pressure and velocity at a base state level; increasing the cross sectional area of the variable area nozzle to increase exhaust gas flow through the variable area nozzle; lighting the afterburner to increase the exhaust gas temperature; and retarding engine throttle to lower the engine exhaust pressure. Together the afterburner lighting and engine throttle retarding steps reduce exhaust gas pressure from its base state level while holding exhaust gas velocity at a level at the base state, thereby maintaining engine thrust while reducing engine noise.

The method may be supplemented by unconventional operation of the afterburner(s). For example, the afterburner may be operated so that the exhaust gas outer stream is sufficiently hotter than the inner stream to create an inverted velocity profile.

A system for reducing noise during takeoff from a turbofan jet engine equipped with turbomachinery, an afterburner and a variable area nozzle is also provided. The system may use conventional hardware but comprise a novel software component that simultaneously ignites the afterburner and reduces power to the turbomachinery.

Further discussion of these and other features is provided below in connection with one or more embodiments, examples of which appear immediately below.

BRIEF DESCRIPTION OF THE DRAWINGS

So that the manner in which the above recited concepts of the present disclosure may be understood in detail, a more particular description is provided by reference to the embodiments, which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

In the discussion that follows the following nomenclature is used:

α=proportional symbol
a=speed of sound
A=nozzle cross sectional area
I=sound intensity (noise)
V=exhaust gas velocity
P=nozzle pressure (P)
T=nozzle temperature (T)
$F_g$=thrust
ρ=density
W=exhaust gas mass flow rate Broadly stated, the present invention is a system and method of reducing noise caused by jet engines equipped with afterburners during afterburner operation. Simply put, the present invention is a quieter way to achieve thrust. This objective is accomplished by employing a method of jet aircraft operation that comprises the steps of using the afterburner to heat the exhaust gas flow while simultaneously reducing power to the core engine (turbo-machinery). Heating the exhaust gas flow increases its temperature and reduces the density of the exhaust gas exiting the afterburner nozzle. Reducing power to the engine (by retarding the engine throttle) lowers the pressure of the exhaust gas entering the nozzle area. Together these two operations reduce the pressure of the exhaust gas in the nozzle area while holding the exhaust gas velocity constant, which maintains engine thrust while decreasing engine noise. The method may be supplemented by altering the location of the afterburner flames to create an inverted exhaust velocity profile (IVP), thereby decreasing engine noise even further.

Jet Engine Principles

A typical turbofan jet engine works by forcing compressed air into a combustion chamber, introducing fuel into the combustion chamber, and igniting the fuel so that the exhaust gases exit a downstream nozzle, thereby creating thrust. Additional, albeit temporary, thrust may be achieved by using an afterburner, but at a cost of increased noise.

Figure 1:
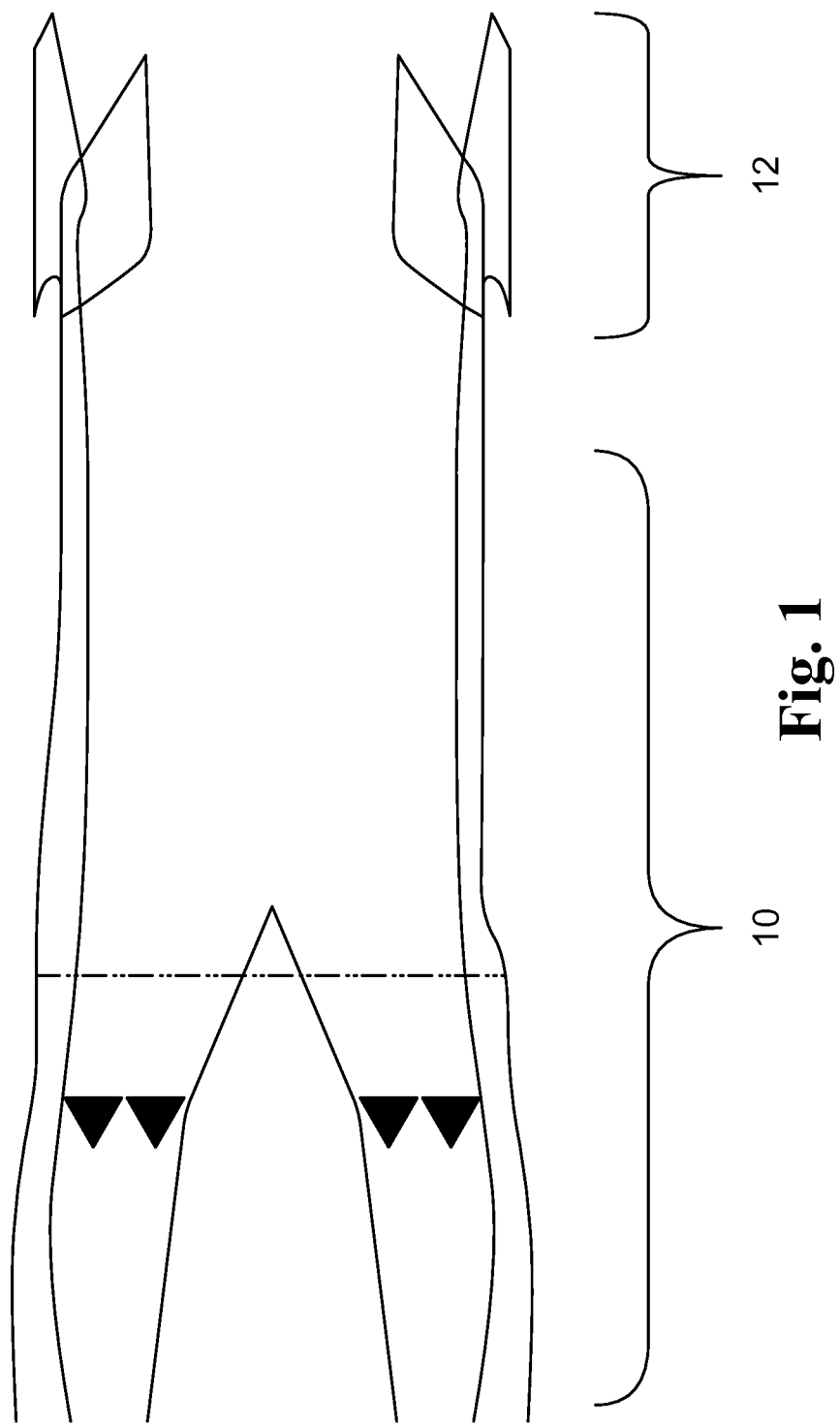
FIG. 1 is a cross sectional view of a typical afterburner system.

FIG. 1 is a schematic diagram of a typical afterburner system, comprising the afterburner 10 and a variable area nozzle 12. The turbomachinery (turbofan compressor, burner and turbines) are located upstream of the afterburner 10 and are not shown.

Afterburners work by injecting additional fuel into the nozzle region downstream of the combustion chamber. The fuel ignites due to the presence of unused oxygen in the hot exhaust stream, and produces a blowtorch effect, increasing the temperature and velocity of the exhaust gas shooting through the nozzle, which boosts thrust. In short, afterburners work by increasing the velocity of exhaust gas exiting the nozzles. The greater the velocity of exhaust gas exiting the afterburner nozzles, the greater the thrust and noise.

Unfortunately, the exhaust gas exiting the afterburners of high velocity jet engines can create undesirably high levels of noise. The present invention addresses this problem by exploiting the effects of exhaust gas density, pressure and temperature on engine thrust when the afterburner's higher thrust levels are not required.

The Invention

The present invention provides a quieter way to maintain thrust while holding the exhaust gas velocity (V) and exhaust gas mass flow rate (W) constant. The invention takes advantage of the fact that the velocity of the exhaust gases exiting the nozzle is a function of nozzle pressure (P) and nozzle temperature (T). More particularly, exhaust gas velocity is directly proportional to nozzle pressure (P) and nozzle temperature (T).

The present invention increases the nozzle temperature and reduces nozzle pressure to allow nozzle velocity (V), and thus thrust ($F_g$), to remain constant. This is achieved by reducing the density ($\rho$) of the engine exhaust by heating it with the afterburner, a process referred to as partial augmentation. Lowering the exhaust gas density while maintaining a constant exhaust gas velocity (V) results in quieter engine thrust.

Figure 2:
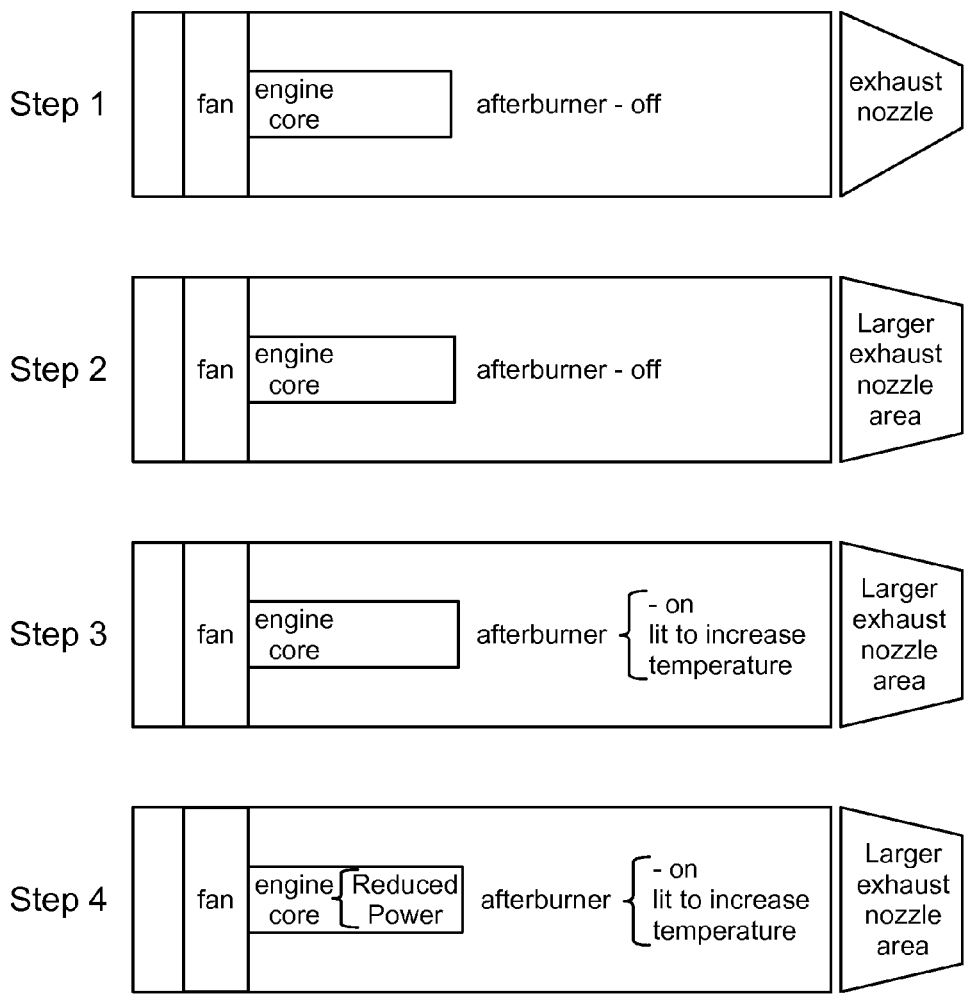
FIG. 2 is a flow diagram illustrating the method of the present invention.

FIG. 2 is a flow diagram showing a method of operating an aircraft according to the present invention, expressed in terms of how the aircraft hardware (mainly the exhaust nozzle, afterburner and engine) is manipulated (controlled).

As indicated at Step 1, after starting the core engine, but with the afterburner off (so no extra heat is being added to the engine exhaust), the engine thrust ($F_g$) is being provided solely by the engine exhaust gas mass flow rate (W) and the exhaust gas pressure (P). (Generally, the ratio of the pressure inside the nozzle to that outside the nozzle determines the exhaust gas velocity (V), sometimes expressed as the Mach number, or V/a). The exhaust gas velocity (V), temperature (T) and pressure (P) are at "base state levels".

To achieve base thrust while mitigating engine noise the aircraft may be operated in the following manner:

Step 2: The aircraft operator (pilot) controls the variable area nozzle by increasing the nozzle cross sectional area (A), which increases the exhaust gas mass flow rate (W) exiting the nozzle. The increased flow (W) occurs at a constant exhaust gas pressure (P), and thus at a constant pressure ratio ($P_{exhaust}/P_{ambient}$), so engine thrust ($F_g$) will increase. The afterburner is off. The exhaust gas velocity and temperature remain at base state levels.

Step 3 (Partial Augmentation): The pilot lights the afterburner, which increases (augments) the exhaust gas temperature (T) and velocity (V) above the base state levels. The increase in temperature reduces the density ($\rho$) of the exhaust gas exiting the afterburner nozzle.

Step 4: With the afterburner remaining lit to achieve increased temperature (T), the engine controller retards the engine throttle (reduces power to the engine core), which lowers the engine exhaust gas velocity (V) and thus the exhaust gas mass flow rate (W) back to the base level.

Together, steps 3 and 4 (lighting the afterburner and reducing engine throttle) reduce exhaust gas pressure (P) to its base state level, while holding the exhaust gas velocity (V) constant (at the base state level), which maintains the base thrust level while reducing engine noise. These two steps may be done in sequence or simultaneously to maintain a smooth transition.

Supplementing Partial Augmentation with Inverted Velocity Profile (IVP)

In addition to reducing exhaust gas density by using the afterburner to heat the exhaust gas as explained above, creating an inverted velocity profile (IVP) can also achieve a noise benefit (i.e., mitigate jet engine noise). In a typical turbofan jet engine the velocity of the exhaust gas exiting the nozzle is higher in the inner stream (in the middle of the exhaust plume) than in the outer stream. This profile can be reversed by firing the afterburner in the outer zone only. IVPs are known to reduce mixing noise by creating an additional shear zone to further collapse the noise producing high velocity exhaust gas jet plume.

Figure 3:
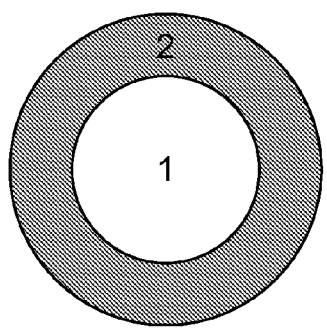
FIG. 3 is a schematic diagram showing an afterburner having multiple operating zones.

FIG. 3 is a simplified schematic diagram showing an afterburner having multiple operating zones such as might be found on a military jet. One or more inner burning zones (1) radiate out from the central axis and are relatively closer to the central axis than the outer burning none(s) (2). The outer burning zone(s) (2) are located in the circumferential area around the inner zones (1) and are adjacent the nozzle wall. The burning zones are optimized for stable combustion. The engine controller can incrementally light up each zone as needed for additional thrust. This is normally done by running the pilot and inner zones and then adding the outer zone(s) as more thrust is required. By firing the zones in an "abnormal" way (by shutting off the zones that would normally be lit first as explained below), an IVP, and thus reduced mixing noise, can be achieved.

Figure 4:
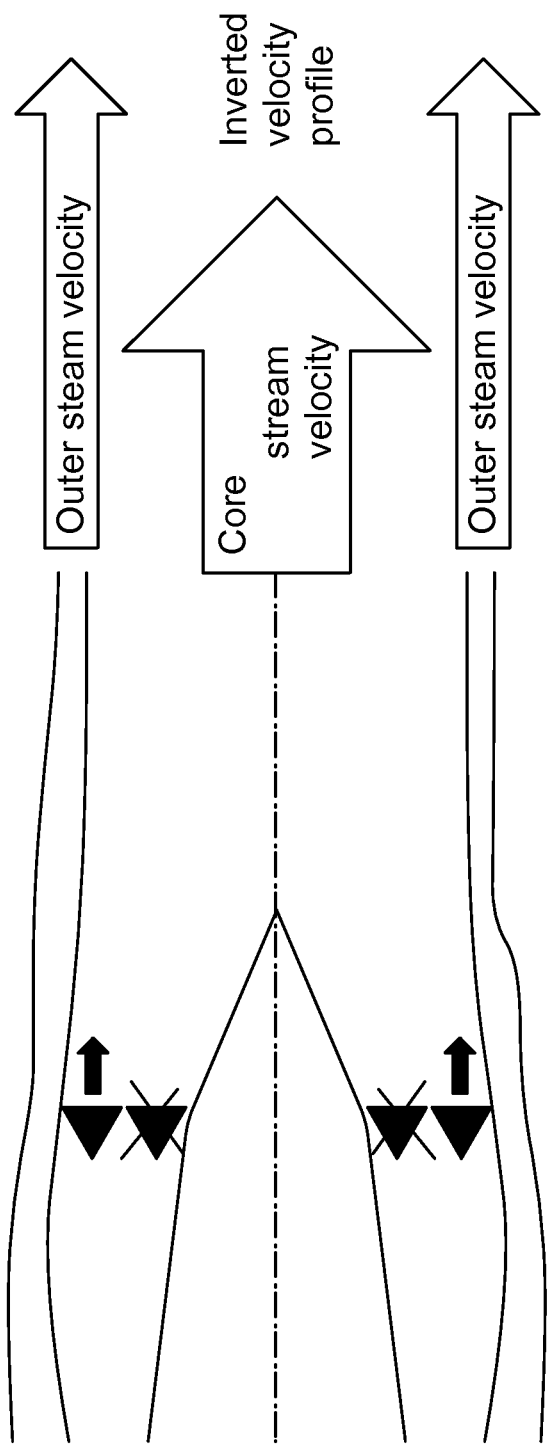
FIG. 4 is a schematic diagram of the exhaust gas velocity exiting a conventional afterburner nozzle showing an inverted velocity profile.

FIG. 4 is a schematic diagram of the exhaust gas velocity exiting a conventional afterburner nozzle showing an inverted velocity profile (IVP) with the greatest velocity near the outer stream. By first lighting the afterburner fuel tubes in Pilot mode and then transitioning to Outer Zone only, an inverted velocity profile IVP can be achieved. In other words, by shutting off the inner zone(s) and only turning on the outer zone(s), the temperature increase will occur primarily in the outer stream, resulting in an IVP. Employing the partial augmentation procedure described above (lowering the density of the exhaust gas while maintaining constant exhaust gas velocity and thrust) can be made even quieter by using IVP.

The following calculation demonstrates the effectiveness of decreasing the density ($\rho$) while maintaining velocity, flow, and thrust of the exhaust gas to reduce jet noise.

Jet engine noise, aka sound intensity (I), is proportional to jet engine exhaust density ($\rho$), nozzle velocity (V) and nozzle area (A):

$$I \alpha \rho^2 \times V^8 \times A \quad (1)$$

In other words, engine noise increases as exhaust gas density, exhaust gas volume or exhaust nozzle area increases. Reducing any of these variables will reduce jet engine noise. Yet reducing exhaust gas nozzle velocity can also reduce engine thrust ($F_g$). The present invention reduces jet engine noise (I) while maintaining an increased level of jet engine thrust ($F_g$) caused by afterburner operation.

To demonstrate how this is achieved we start with the calculation for the mass flow rate of the engine exhaust (W), which is expressed as follows:

$$W = \rho \times A \times V \quad (2)$$

Jet engine thrust ($F_g$) is a function of the mass flow rate (W) and the nozzle velocity (V) of the jet engine exhaust:

$$F_g = W \times V \quad (3)$$

Substituting (2) into (3) results in:

$$F_g = \rho \times A \times V^2 \quad (4)$$

By isolating velocity we obtain:

$$V^2 = F_g/(\rho \times A) \quad (5)$$

Substituting equation (5) into equation (1) we obtain:

$$I \alpha \rho^2 \times (F_g/(\rho \times A))^4 \times A \quad (6)$$

Or, when simplified:

$$I \alpha (F_g)^4/(\rho^2 \times A^3) \quad (7)$$

In other words, jet engine noise (I) is proportional to thrust ($F_g$), and inversely proportional to exhaust gas density ($\rho$) squared and nozzle area (A) cubed. Normalizing equations (7), (5) and (1) by the baseline:

$$I/I_{base} = (F_g/F_{g\text{-}base})^4 (\rho/\rho_{base})^{-2} (A/A_{base})^{-3} \quad (8)$$

$$V/V_{base} = (F_g/F_{g\text{-}base})^{1/2} (\rho/\rho_{base})^{-1/2} (A/A_{base})^{-1/2} \quad (9)$$

$$W/W_{base} = (\rho/\rho_{base})(A/A_{base})(V/V_{base}) \quad (10)$$

Substituting equation (9) into equation (10):

$$W/W_{base} = (\rho/\rho_{base})^{1/2} (A/A_{base})^{1/2} (F/F_{base})^{1/2} \quad (11)$$

Assuming constant thrust ($F_g = F_{g\text{-}base}$), equations (8) and (11) become:

$$I/I_{base} = (\rho/\rho_{base})^{-2} (A/A_{base})^{-3} \quad (12)$$

$$W/W_{base} = (\rho/\rho_{base})^{1/2} (A/A_{base})^{1/2} \quad (13)$$

Re-arranging equation (13) to get area versus mass flow and density:

$$A/A_{base} = (W/W_{base})^2 (\rho/\rho_{base})^{-1} \quad (14)$$

Substituting equation (14) into equation (12):

$$I/I_{base} = (\rho/\rho_{base})(W/W_{base})^{-6} \quad (15)$$

And taking the logarithm:

$$\Delta I = 10 \log_{10}(\rho/\rho_{base}) - 60 \log_{10}(W/W_{base}) \quad (16)$$

From equations (14) and (16) it can be seen that jet engine noise level (I) can be reduced at constant thrust by decreasing the density ($\rho$) and/or increasing the mass flow rate (W) of the exhaust gas. The present invention accomplishes this by providing a method of jet aircraft operation comprising the steps of using the afterburner to increase exhaust gas temperature (T) while simultaneously reducing the engine turbo-machinery power setting ("throttle back"). The combination of these two steps reduces exhaust gas density while maintaining velocity. The lower density ($\rho$) exhaust gas produces less jet noise (I) at constant thrust ($F_g$), jet velocity (V) and flow (W).

APPLICATIONS

The invention is intended for use in jet engines equipped with an afterburner and, specifically, for use with turbofan jet engines. The invention does not require any new aircraft or jet engine hardware. The only added component might be, for example, a computer program in the electronic control system to automatically operate in reduced noise mode.

The invention may be used in military aircraft, including military aircraft designed for carrier takeoffs. The afterburner uses more fuel during take-off, but when operated according to the present invention, emits a lower level of noise. This is particularly important where aircraft personal are repeatedly exposed to noise from jet engines during repeated take-offs.

Carrier take-offs may be done at the same exhaust gas velocity and mass flow as in normal take-offs but, as explained above, at reduced exhaust gas pressure. In practice, the engine controller would drop the exhaust gas pressure by pulling back on the throttle to the main engine, but get engine thrust back (maintain engine thrust) due to the increase in exhaust gas temperature caused by the afterburner. In other words, during take-off the pilot can pull back on the throttle to the turbomachinery, which reduces the pressure of the exhaust gas entering the afterburner, but maintain the exhaust gas velocity in the nozzle area (and therefore engine thrust) by increasing exhaust gas temperature through the use of the afterburner.

The invention may also have a commercial use, for example, such as in private business jets designed for supersonic flight where FAA certification is an issue.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A method of reducing noise from a turbofan jet engine equipped with an afterburner and a variable area nozzle, the nozzle having a cross sectional area, the method comprising the steps of:
   starting the engine to create exhaust gas flow through the variable area nozzle, the exhaust gas having a temperature, pressure and velocity at a base state level;
   increasing the cross sectional area of the variable area nozzle to increase exhaust gas flow through the variable area nozzle;
   lighting the afterburner to increase the exhaust gas temperature; and retarding engine throttle to lower the engine exhaust gas flow rate;

wherein the afterburner lighting and engine throttle retarding steps reduce exhaust gas pressure to its base state level while holding exhaust gas velocity at a level above the base state, thereby maintaining engine thrust while reducing engine noise.

2. The method of claim 1 wherein the exhaust gas stream comprises an inner stream and an outer stream and the afterburner comprises fuel tubes, the method comprising the further step of:

lighting the afterburner fuel tubes so that the exhaust gas outer stream is sufficiently hotter than the inner stream to create an inverted velocity profile.

3. The method of claim 1 wherein the exhaust gas stream comprises an inner stream and an outer stream and the afterburner comprises a first zone corresponding to the inner stream and a second zone corresponding to the outer stream, the method comprising the further step of:

lighting the afterburner in the second zone only so that the exhaust gas outer stream is sufficiently hotter than the inner stream to create an inverted velocity profile.

4. A system for reducing noise during takeoff from a turbofan jet engine equipped with turbomachinery, an afterburner and a variable area nozzle, the afterburner having a maximum operating output, the system comprising:

a controller operable to simultaneously ignite the afterburner and reduce power to the turbomachinery.

* * * * *